United States Patent
Zhu et al.

(10) Patent No.: US 11,981,602 B2
(45) Date of Patent: May 14, 2024

(54) HIGH-TOUGHNESS GEOPOLYMER GROUTING MATERIAL MODIFIED BY ULTRA-HIGH WEIGHT FIBERS AND EMULSIFIED ASPHALT, PREPARATION AND APPLICATION

(71) Applicant: TONGJI UNIVERSITY, Shanghai (CN)

(72) Inventors: Xingyi Zhu, Shanghai (CN); Yafeng Pang, Shanghai (CN); Yuchuan Du, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 148 days.

(21) Appl. No.: 17/915,490

(22) PCT Filed: Jan. 25, 2021

(86) PCT No.: PCT/CN2021/073559
§ 371 (c)(1),
(2) Date: Sep. 29, 2022

(87) PCT Pub. No.: WO2022/099935
PCT Pub. Date: May 19, 2022

(65) Prior Publication Data
US 2023/0227361 A1    Jul. 20, 2023

(30) Foreign Application Priority Data

Nov. 16, 2020   (CN) .......................... 202011281142.1

(51) Int. Cl.
| C04B 28/00 | (2006.01) |
| C04B 111/00 | (2006.01) |
| C04B 111/70 | (2006.01) |
| E01C 7/14 | (2006.01) |

(52) U.S. Cl.
CPC .......... C04B 28/003 (2013.01); C04B 28/006 (2013.01); E01C 7/147 (2013.01); C04B 2111/0075 (2013.01); C04B 2111/70 (2013.01); C04B 2201/50 (2013.01)

(58) Field of Classification Search
CPC ................ C04B 28/003; C04B 28/006; C04B 2111/0075; C04B 2111/70; C04B 2201/50; E01C 7/147
See application file for complete search history.

(56) References Cited

FOREIGN PATENT DOCUMENTS

| CN | 102596848 | 7/2012 |
| CN | 103232182 | 8/2013 |
| CN | 108529936 | 9/2018 |
| CN | 108675699 | 10/2018 |
| WO | 2020122726 | 6/2020 |

OTHER PUBLICATIONS

Behzad Nematollahi et al., "High ductile behavior of a polyethylene fiber-reinforced one part geopolymer composite: A micromechanics-based investigation", Archives of Civil and Mechanical Engineering, Jan. 19, 2017, pp. 555-563.
"International Search Report (Form PCT/ISA/210) of PCT/CN2021/073559," dated May 31, 2021, with English translation thereof, pp. 1-6.

*Primary Examiner* — Anthony J Green
(74) *Attorney, Agent, or Firm* — JCIP GLOBAL INC.

(57) ABSTRACT

The present invention relates to a high-toughness geopolymer grouting material modified by ultra-high molecular weight fibers and emulsified asphalt, and a preparation method and application thereof, wherein the grouting material comprises the following components in parts by mass: 4-12 parts of emulsified asphalt, 80-100 parts of a geopolymer, 103-126 parts of an alkali-activated solution, 2-3 parts of ultra-high molecular weight fibers and 30-35 parts of water. Compared to the prior art, the grouting material modified by ultra-high molecular weight fibers and emulsified asphalt is simple to prepare, has good fluiditygood, and matches well with road substrate; the good toughness and crack control capability of the ultra-high molecular weight fibers enables this novel grouting material to overcome the problem in durability of common geopolymer-based materials. The material of the present invention can be applied in filling voids beneath a slab of a cement concrete pavement and in the technology of non-excavation road reinforcement of a road base course and a subgrade of a high-grade highway.

2 Claims, 6 Drawing Sheets

HIGH-TOUGHNESS GEOPOLYMER GROUTING MATERIAL MODIFIED BY ULTRA-HIGH WEIGHT FIBERS AND EMULSIFIED ASPHALT, PREPARATION AND APPLICATION

CROSS-REFERENCE TO RELATED APPLICATION

This application is a 371 application of International PCT application serial no. PCT/CN2021/073559 filed on Jan. 25, 2021, which claims the priority benefit of China application no. 202011281142.1, filed on Nov. 16, 2020. The entirety of each of the above mentioned patent applications is hereby incorporated by reference herein and made a part of this specification.

TECHNICAL FIELD

The present invention relates to the technical field of road construction materials and, in particular, to a high-toughness geopolymer grouting material modified by ultra-high weight fibers and emulsified asphalt, and a preparation method and application.

DESCRIPTION OF RELATED ART

Roads are a major traffic carrier. As a result of repeated traffic loads and complicated natural conditions, including the combined effects of temperature and humidity, they may suffer damage, such as scouring-caused voids and subsidence in the subgrade, and insufficient local strength, which severely affect travelling comfort and reduce the service life of roads. At present, overlay treatment, excavation and resurfacing, and grouting reinforcement are often used to solve the above-mentioned problem. Among them, grouting reinforcement has become one of the preferred techniques for road repair and reinforcement without excavation thanks to sophisticated technologies, easy steps, low cost, and short construction period, etc.

Cement-based grouting materials have been widely used in the field of road engineering, and witnessed fast development. After being injected into a layer to be reinforced, they occupy voids through filling, infiltration and compaction, and bond loose particles. In doing so, they are integrated with original road structure to restore the inter-roadbed and the roadbed-to-subgrade continuity, thus improving the load capacity and strength of original roads, and extending their service life by addressing road damage.

Given their low early strength, low toughness, and poor durability, however, grouting materials with conventional silicate cement as the main component cannot meet the need for rapid construction and road reopening in a short time.

CN103232182A disclosed a geopolymer/emulsified-asphalt composite material and preparation method, wherein the material essentially consists of following components in weight parts: 75-95 parts of geopolymer slurry and 5-25 parts of emulsified asphalt; and the geopolymer is prepared by mixing an alkali-activated active material and modified water glass in a mass ratio of 1:1. The alkali-activated active material is one of or a mixture of two more of metakaolin, slag, and fly ash. The geopolymer/emulsified-asphalt material in this technical scheme is intended for the preparation of a high-strength material, and preparation process involves high-temperature calcination, low-, medium- and high-temperature curing, and compression molding, etc. Additionally, the material's workability is not mentioned in the invention. Therefore, it is not suitable for being used as a preferred geopolymer grouting material.

SUMMARY

In view of the above drawbacks in the prior art, the object of the present invention is to provide a high-toughness geopolymer grouting material modified by ultra-high molecular weight fibers and emulsified asphalt, and a preparation method and application, in order to solve the technical problems of existing grouting materials like poor durability and low compatibility with the road substrate.

The object of the present invention can be achieved by adopting the following technical schemes.

As one of the technical concepts of the present technical scheme, the geopolymer has better strength and durability than conventional portland cement, and the raw material is widely available, having a high level of components such as activated silica and alumina but a low carbon footprint. Thus, it is considered as one of the most promising materials for application in emergency work. Moreover, roads can be open to traffic after 4 h curing of geopolymers at room temperature, and take-off and landing of planes can be allowed after 6 h curing. Therefore, the geopolymer has unique advantages in rapid repairing.

As one of the technical concepts of the present technical scheme, emulsified asphalt can be added to make up for the shortcomings of conventional cement-based grouting materials. Emulsified asphalt has the following advantages, such as low cost, easily building and good workability. This means that the prepared composite material has characteristics of both cement/geopolymers and asphalt, thereby achieving a combined effect of good stiffness and good toughness. In addition, ultra-high molecular weight fibers are included in the grouting material in consideration of the extremely high ultimate tensile strength and crack control capability thereof, such that the emulsified-asphalt/geopolymer based grouting material has improved toughness and durability and has improved cohesiveness with the road substrate, resulting in an improved effect of the grouting material.

The high-toughness geopolymer grouting material modified by ultra-high molecular weight fibers and emulsified asphalt of the present invention comprises the following components in parts by weight:

4-12 parts of emulsified asphalt,
80-100 parts of a geopolymer,
103-126 parts of an alkali-activated solution,
2-3 parts of an ultra-high molecular weight fiber, and
30-35 parts of water.

Further, the geopolymer comprises a combination of one or more of metakaolin, kaolinite, fly ash and slag.

Further, the geopolymer has a density of 2.2-2.7 $g \cdot cm^{-3}$, an elastic modulus of 50-55 GPa, tensile strength of 30-190 MPa, compressive strength of 40-120 MPa and fracture energy of 50-1500 $J \cdot cm^{-2}$.

Further, the emulsified asphalt is cationic emulsified asphalt which is medium-breaking or slow-breaking. The cationic emulsified asphalt has a screen residue of less than or equal to 0.1% and 1-day room-temperature stability of less than or equal to 1%.

Further, the ultra-high molecular weight fiber is polyethylene fiber with a molecular weight of 1,000,000-5,000,000, an ultimate tensile strain of 3%-7%, a fiber length of 6-18 mm, a nominal strength of 2900-3800 MPa and an elastic modulus of 100-120 GPa.

Further, the alkali-activated solution consists of sodium silicate solution and sodium hydroxide particles, specifically comprising the following components in parts by weight: 11-15 parts of sodium silicate solution, and 1-4 parts of sodium hydroxide particles.

A preparation method of the high-toughness geopolymer grouting material of the present invention comprises the following steps:
(1) weighing preset amounts of water glass solution and sodium hydroxide according to the component requirement to prepare the alkali-activated solution, and allowing the prepared solution to stand for 18-36 h;
(2) weighing each raw material according to the mass parts;
(3) adding a portion of the geopolymer into a mixing pot of a cement paste mixer, turning on the mixer, and after mixing for 20-40 s, adding the alkali-activated solution into the mixing pot for a further mixing for 1-2 min;
(4) adding the ultra-high molecular weight fibers into the mixing pot in 2-4 batches, and stirring quickly after the addition of all of the fibers until well-mixed to obtain a geopolymer-based slurry; and
(5) adding the emulsified asphalt into the geopolymer-based slurry and mixing well to obtain the high-toughness geopolymer grouting material.

Further, in step (4), the mixing is firstly conducted at ⅓ of a rated mixing speed, and then the ultra-high molecular weight fibers are added into the mixing pot in 2-4 batches, and after that, the mixing is conducted at the rated mixing speed.

Further, the high-toughness geopolymer grouting material obtained in step (5) has a 28-day flexural strength of 12.8 MPa and a 28-day compressive strength of 37.03 MPa.

An application of the high-toughness geopolymer grouting material of the present invention in filling voids beneath a slab of a cement concrete pavement and reinforcement of a road base course and a subgrade has broad application prospects in non-excavation road reinforcement.

Compared to the prior art, the present invention has the following technical advantages.

1) A self-designed proportion of mixture is adopted herein for the high-toughness geopolymer modified by ultra-high molecular weight fibers and emulsified asphalt, wherein the addition of cationic emulsified asphalt enables the grouting material to have advantages like relatively low temperature sensitivity, better crack resistance and anti-permeability, and an elastic modulus essentially matching that of subgrade materials. In addition, the adsorption of emulsified asphalt particles on the surface of hydration products of the geopolymer can hinder the hydration to a certain extent, thus improving the fluidity retention of the slurry.

2) The composite material obtained by adding ultra-high molecular weight fibers to the high-toughness geopolymer modified by ultra-high molecular weight fibers and emulsified asphalt would exhibit strain hardening and multiple cracking, showing good crack control capability, and can effectively prevent the introduction of harmful impurities and water, thereby improving the durability of the grouting material; meanwhile, as a result of fiber bridging, the reinforcement effect of the grouting material is not limited by the mechanical properties of the binding interface of engineered cementitious composite (ECC) and the road substrate, and the fatigue life depends on the performance of the grouting material, thus further improving the compatibility of the grouting material with the road substrate structure.

3) The high-toughness geopolymer modified by ultra-high molecular weight fibers and emulsified asphalt of the present invention has the characteristics of simple and easy preparation procedures, low cost, good toughness, good early strength and good anti-permeability, good durability and high compatibility with the road substrate structure. It can be used in the technology of non-excavation reinforcement for the road base course, subgrade and filling voids beneath pavement slabs.

4) The addition of emulsified asphalt enables a combination of the water sealing property of the asphalt material with the high strength of the geopolymer after solidification of the slurry; the bridging effect of the ultra-high molecular weight fibers in the hardened grouting material improves the durability of the conventional geopolymer grouting material and increases the binding force at the interface between the grouting material and the road substrate interface.

5) The high-toughness geopolymer grouting material modified by ultra-high molecular weight fibers and emulsified asphalt herein is simple to prepare, has good fluidity, has the combined characteristics of geopolymers and asphalt in good stiffness and good toughness, and can match well with the road substrate; the good toughness and crack control capability of ultra-high molecular weight fibers enables this novel grouting material to overcome the problem in durability of common geopolymer-based materials. The material of the present invention can be used in filling voids beneath a cement concrete pavement slab and in the non-excavation technology of reinforcement of a road base course and a subgrade of a high-grade highway.

DESCRIPTION OF THE EMBODIMENTS

Figure 1:
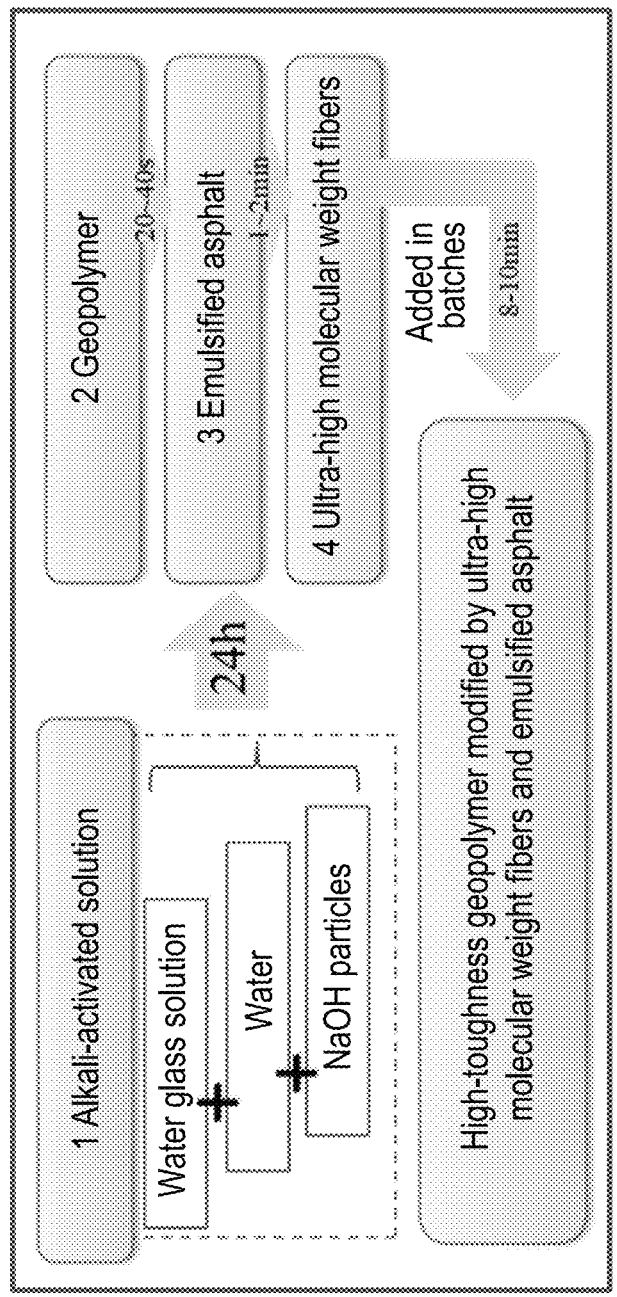
FIG. 1 is a flow chart of the high-toughness geopolymer grouting material modified by ultra-high molecular weight fibers and emulsified asphalt of the present invention.

The present invention will be described in details hereinafter with reference to the accompanying drawings and detailed examples.

In view of the drawbacks in the prior art, the object of the present invention is to provide a high-toughness geopolymer modified by ultra-high molecular weight fibers and emulsified asphalt, and a preparation method thereof, in order to solve the technical problems of existing grouting materials like poor durability and low compatibility with the road substrate.

The geopolymer in the present invention has the characteristics of abundance in raw materials, low energy consumption for preparation and low carbon emission, as well as fast hardening and good early strength, high-temperature resistance and low thermal conductivity, high corrosion resistance, low permeability, etc. It is regarded as the most promising alternative material for cement.

The hydration of the geopolymer herein includes processes of dissolution and complexation, migration and diffusion, concentration polymerization, and dehydration and hardening of aluminosilicates, which specifically comprises:

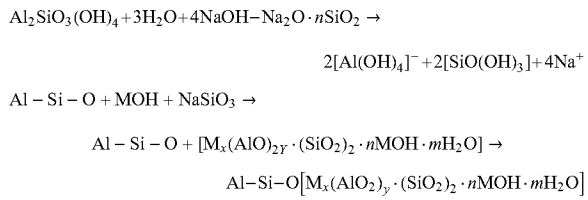

$Al_2SiO_3(OH)_4 + 3H_2O + 4NaOH - Na_2O \cdot nSiO_2 \rightarrow$ $2[Al(OH)_4]^- + 2[SiO(OH)_3] + 4Na^+$ $Al - Si - O + MOH + NaSiO_3 \rightarrow$ $Al - Si - O + [M_x(AlO)_{2Y} \cdot (SiO_2)_2 \cdot nMOH \cdot mH_2O] \rightarrow$ $Al - Si - O[M_x(AlO_2)_y \cdot (SiO_2)_2 \cdot nMOH \cdot mH_2O]$ Herein, the main components of geopolymer clinker and hydration products react with HCl in emulsified asphalt to produce an insoluble double salt, hydrated calcium chloroaluminate, forming a product of an inorganic-organic composite structure in which the geopolymer, the hydration products of the geopolymer and asphalt film are interpenetrated.

The hydration reaction of the emulsified asphalt/geopolymer of the present invention is as follows.

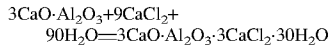

$3CaO \cdot Al_2O_3 + 9CaCl_2 + 90H_2O = 3CaO \cdot Al_2O_3 \cdot 3CaCl_2 \cdot 30H_2O$

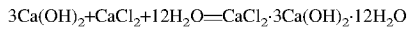

$3Ca(OH)_2 + CaCl_2 + 12H_2O = CaCl_2 \cdot 3Ca(OH)_2 \cdot 12H_2O$

The water glass used in the present invention is one of the important raw materials for the preparation of gel materials via alkali-activation of industrial waste residue. Water glass can be divided into sodium water glass and potassium water glass according to the type of the alkali metal, the main components of which are silicon dioxide and alkali metal oxides, and the molecular formula thereof are $Na_2O \cdot nSiO_2$ and $K_2O \cdot nSiO_2$ respectively, where n is the water glass modulus. The sodium silicate solution provided in the present invention consists of silicon dioxide ($SiO_2$), sodium oxide ($Na_2O$) and water ($H_2O$), wherein the mass ratio of each part is as follow:

20-30 parts of silicon dioxide;
5-15 parts of sodium oxide; and
65-69 parts of water.

The dispersibility of polyethylene fibers in this invention affects the workability and mechanical properties of the grouting material significantly. In the preparation of slurry of the high-toughness geopolymer modified by ultra-high molecular weight fibers and emulsified asphalt, the fibers are mixed by the pre-addition method for admixture, wherein the geopolymer slurry and the fibers are pre-agitated, and the fibers are added in batches and mixed at a low speed firstly and then at a high speed.

In view of the current situation of the conventional emulsified asphalt cement-based grouting material with poor early strength, insufficient durability and low compatibility with the road substrate, and in order to improve the durability of grouting materials, ultra-high molecular weight fibers are added into the conventional grouting material in the present invention to improve the toughness and durability of the grouting material, to prevent the introduction of harmful impurities and water and to improve the compatibility of the grouting material with the road substrate, so as to obtain a grouting material with good early strength, good toughness and high compatibility with the main structure of the pavement, which is especially suitable for the technology of non-excavation road reinforcement.

The high-toughness geopolymer modified by ultra-high molecular weight fibers and emulsified asphalt provided in the present invention consists of emulsified asphalt, a geopolymer, ultra-high molecular weight fibers, alkali-activated solution and water. The emulsified asphalt enables a combination of the water sealing property of the asphalt material with the high strength of the geopolymer after solidification of the slurry; the bridging effect of the ultra-high molecular weight fibers in the hardened grouting material improves the durability of the conventional geopolymer-based grouting material and increases the binding force at the interface between the grouting material and the road substrate.

Ultra-high molecular weight fibers are adopted herein as a component of the novel grouting material by making full use of its strain reinforcement and crack control capability.

The present invention improves the conventional grouting materials, including cement-based grouting materials, emulsified asphalt cement-based grouting materials and geopolymer-based grouting materials. Provided herein is an emulsified asphalt geopolymer grouting material mixed with ultra-high molecular weight fibers, characterized by good early strength, good toughness and durability, and has the combined characteristics, i.e., good stiffness and good toughness, of geopolymers and asphalt.

In particular, the ultra-high molecular weight fibers are mixed with the geopolymer by the pre-addition method for admixture in the present invention to prevent the dispersion of the fibers in the geopolymer-based slurry from being affected by water adsorption. The dispersibility of ultra-high molecular weight fibers affects the workability and mechanical properties of the grouting material significantly. In the preparation of slurry of the high-toughness geopolymer modified by ultra-high molecular weight fibers and emulsified asphalt, the fibers are mixed by the pre-addition method for admixture, wherein the geopolymer slurry and the fibers are pre-agitated, and the fibers are added in batches and mixed at a low speed firstly and then at a high speed.

The preparation of the high-toughness geopolymer grouting material modified by ultra-high molecular weight fibers and emulsified asphalt provided in the present invention features simple procedure that is easy to perform and low in cost.

In order to clearly demonstrate the specific implementation process of the present invention, detailed examples are provided hereinafter, and it should be noted that the present invention is not limited to the following detailed examples, and all equivalents made on the basis of the technical scheme of the present application fall into the protection scope of the present invention.

Example 1

Provided in the present example is a high-toughness geopolymer modified by ultra-high molecular weight fibers and emulsified asphalt. The components of the material in parts by mass are as follows:

8 parts of emulsified asphalt
100 parts of geopolymer
120 parts of alkali-activated solution
and 2 parts of ultra-high molecular weight fibers.

The emulsified asphalt of the present example is cationic emulsified asphalt which is medium-breaking or slow-breaking, the cationic emulsified asphalt having a screen residue of less than or equal to 0.1% and 1-day room-temperature stability of less than or equal to 1%.

The geopolymer of the present invention is metakaolin with a volume density of 1.25-1.72 g/cm$^3$.

The ultra-high molecular weight fiber of the present invention has a density of 0.97 g/cm$^3$, a fracture strain of 2-3%, a fiber diameter of 20 µm, a length of 6 mm and a fiber volume fraction of 1%.

The alkali-activated solution of the present example consists of sodium silicate solution (water glass) and sodium hydroxide particles, specifically comprising the following component in parts by mass:
13 parts of sodium silicate, and
4 parts of sodium hydroxide.

The dispersibility of the ultra-high molecular weight fibers in this example affects the workability and mechanical properties of the grouting material significantly. In the preparation of slurry of the high-toughness geopolymer modified by ultra-high molecular weight fibers and emulsified asphalt, the fibers are mixed by the pre-addition method for admixture, wherein the geopolymer and the fibers are pre-agitated, and the fibers are added in batches and mixed at a low speed firstly and then at a high speed.

The high-toughness geopolymer modified by ultra-high molecular weight fibers and emulsified asphalt in the present example comprises the following steps:
preparing the alkali-activated solution according to the established ratio of water glass and sodium hydroxide, and allowing it to stand still and sealed at room temperature for 24 h to ensure that sodium hydroxide was fully dissolved;
weighing each raw material according to the mass parts for later use;
adding a portion of the geopolymer into a mixing pot of a cement paste mixer, turning on the mixer, and after mixing at a low speed for 30 s, adding the alkali-activated solution into the mixing pot for a further mixing for 1-2 min;
adding the ultra-high molecular weight fibers into the mixing pot in 3 batches, and stirring quickly after the addition of all of the fibers until well-mixed; and
adding the emulsified asphalt into the well-mixed geopolymer-based slurry and mixing well.

Performance test: in order to verify that the high-toughness geopolymer modified by ultra-high molecular weight fibers and emulsified asphalt of the present example has good mechanical properties, a strength test was conducted on the grouting material prepared in this example, and the tests included 7-day and 28-day compressive strength and flexural strength tests. Specimens with a dimension of 40×40×160 mm were prepared with specific reference to the Test Methods of Cement and Concrete for Highway Engineering (JTG E30-2005) and Method of Testing Cements for Determination of Strength (ISO method) (GB/T 17671-1999).

Figure 2:
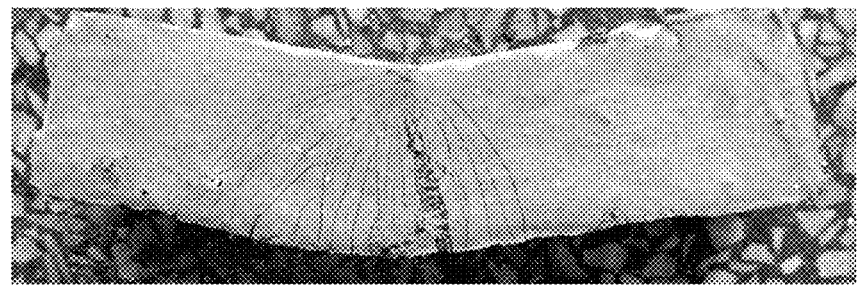
FIG. 2 is a pictorial diagram of a specimen of the geopolymer prepared in Example 1 during a flexural strength test.
Figure 3:
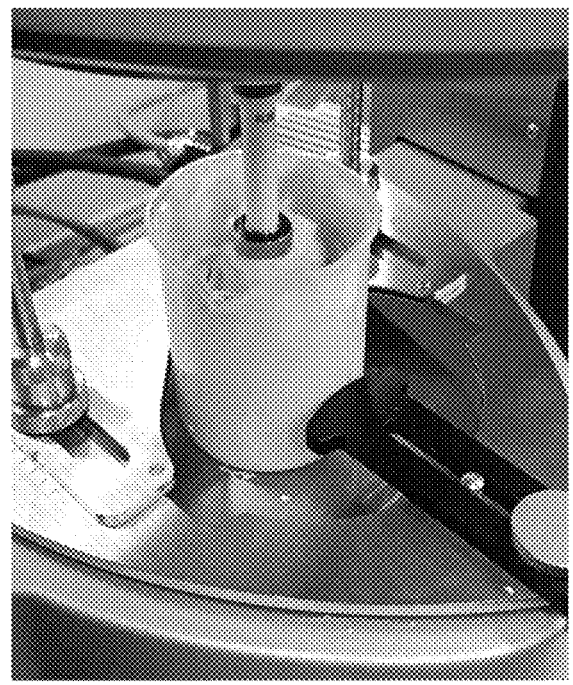
FIG. 3 shows the high-toughness geopolymer modified by ultra-high molecular weight fibers and emulsified asphalt in Examples 2 and 3.

According to FIG. 2, the prepared geopolymer specimens exhibited the macroscopic phenomenon of multiple cracking, all cracking being fine cracks, during the flexural strength test, indicating the capability thereof in improving the durability of conventional grouting materials.

Performance test results of the present example are shown in Table 1.

TABLE 1

Measured strength of the material of the present example

| Age | Flexural strength/MPa | | Compressive strength/MPa | |
| --- | --- | --- | --- | --- |
| | 7 d | 28 d | 7 d | 28 d |
| Value of strength | 11.2767 | 12.8283 | 33.62 | 37.03 |

Example 2

Provided in the present example is a high-toughness geopolymer modified by ultra-high molecular weight fibers and emulsified asphalt. The components of the material in parts by mass are as follows:
8 parts of emulsified asphalt,
100 parts of a geopolymer,
90 parts of an alkali-activated solution, and
2 parts of ultra-high molecular weight fibers.

The type, amount and performance criteria of each raw material in the present example are the same as in Example 1.

The preparation method of the high-toughness cement grouting material and performance test of the present example are essentially the same as in Example 1.

In the present example, the thixotropy index of freshly prepared slurry was measured in order to analyze more precisely the pumpability of the high-toughness geopolymer grouting material modified by ultra-high molecular weight fibers and emulsified asphalt so as to verify the feasibility thereof as a grouting material.

Figure 4:
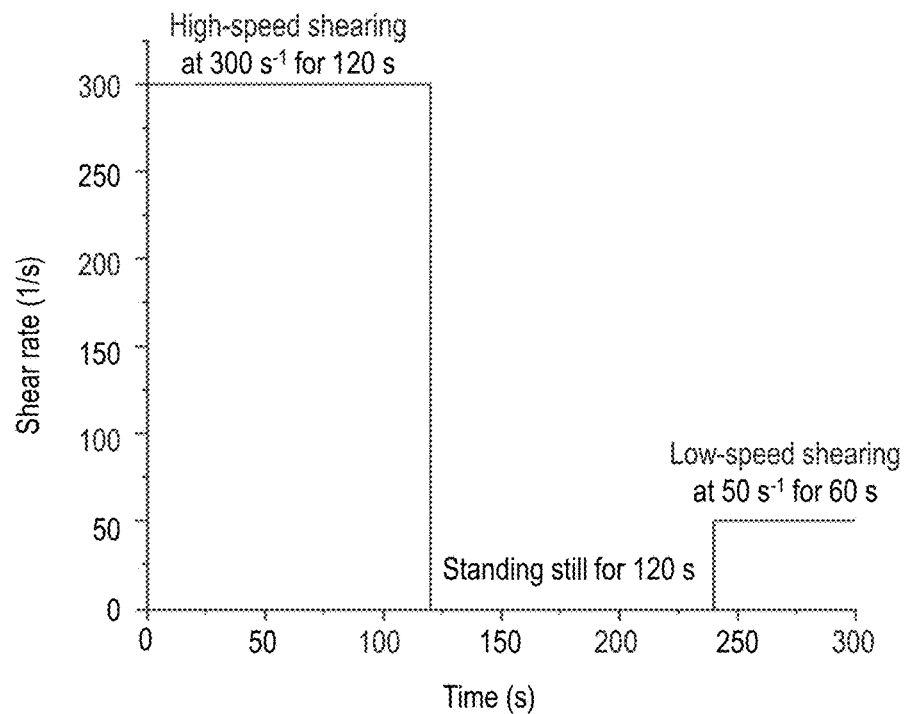
FIG. 4 shows the parameters set in a thixotropy test of the material in Example 2.

According to FIG. 4, the freshly prepared slurry was pre-sheared for 180 s at a constant shear rate of 300 s$^{-1}$; subsequently, it was left to stand for 2 min, and then sheared for 30 s at a constant shear rate of 50 s$^{-1}$.

Figure 5:
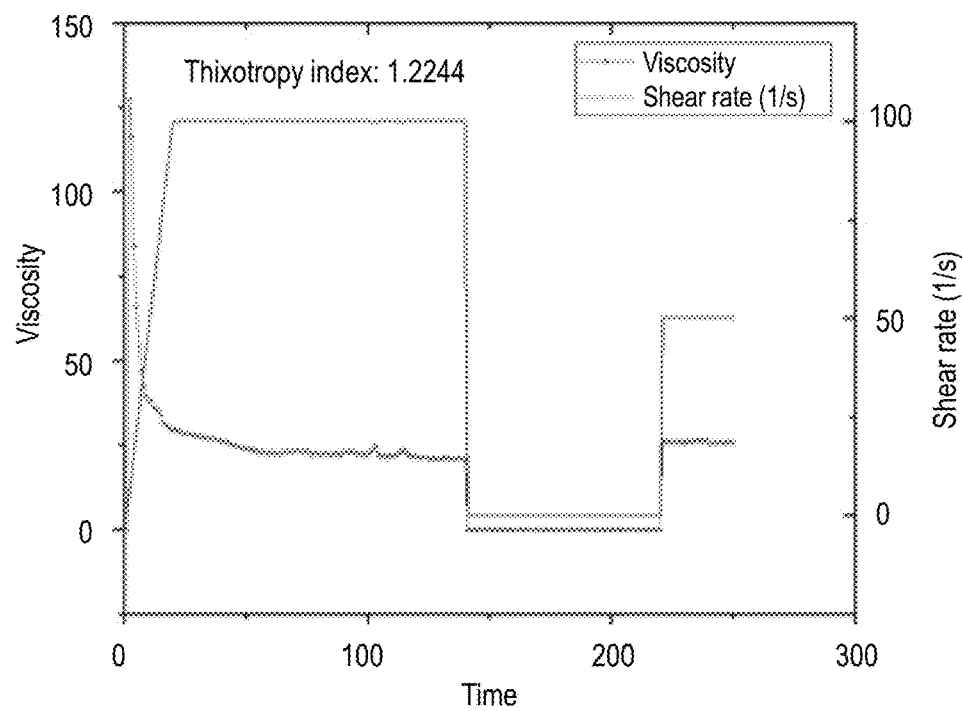
FIG. 5 shows the result of a thixotropy index test of fresh slurry of the high-toughness geopolymer grouting material modified by ultra-high molecular weight fibers and emulsified asphalt prepared in Example 2.

The result of the thixotropy test of fresh slurry of the high-toughness geopolymer grouting material modified by ultra-high molecular weight fibers and emulsified asphalt of the present example is shown in FIG. 5. The thixotropy index of the material was 1.2244, indicating its good thixotropic property as a grouting material.

Example 3

Provided in the present example is a high-toughness geopolymer modified by ultra-high molecular weight fibers and emulsified asphalt. The components of the material in parts by mass are as follows:
8 parts of emulsified asphalt,
100 parts of a geopolymer,
90 parts of an alkali-activated solution, and
2 parts of ultra-high molecular weight fibers.

The type, amount and performance criteria of each raw material in the present example are the same as in Example 1.

The preparation method of the high-toughness geopolymer modified by ultra-high molecular weight fibers and emulsified asphalt in the present example is essentially the same as in Example 1.

The structure recovery capability of freshly prepared slurry was determined in the present example in order to verify more precisely the performance evolution of the high-toughness geopolymer modified by ultra-high molecular weight fibers and emulsified asphalt after being injected into the bottom of a cement concrete pavement slab.

Further included in the present examples is a method for testing the structure recovery capability of the freshly prepared slurry, comprising the following detailed steps:

preparing the high-toughness geopolymer modified by ultra-high molecular weight fibers and emulsified asphalt following the procedures in Example 1, and shearing the freshly prepared slurry for 60 s at a constant shear rate of $0.01\ s^{-1}$, shearing subsequently for 30 s at a constant shear rate of $100\ s^{-1}$, and finally shearing for another 60 s at a restored shear rate of $0.01\ s^{-1}$.

Figure 6:
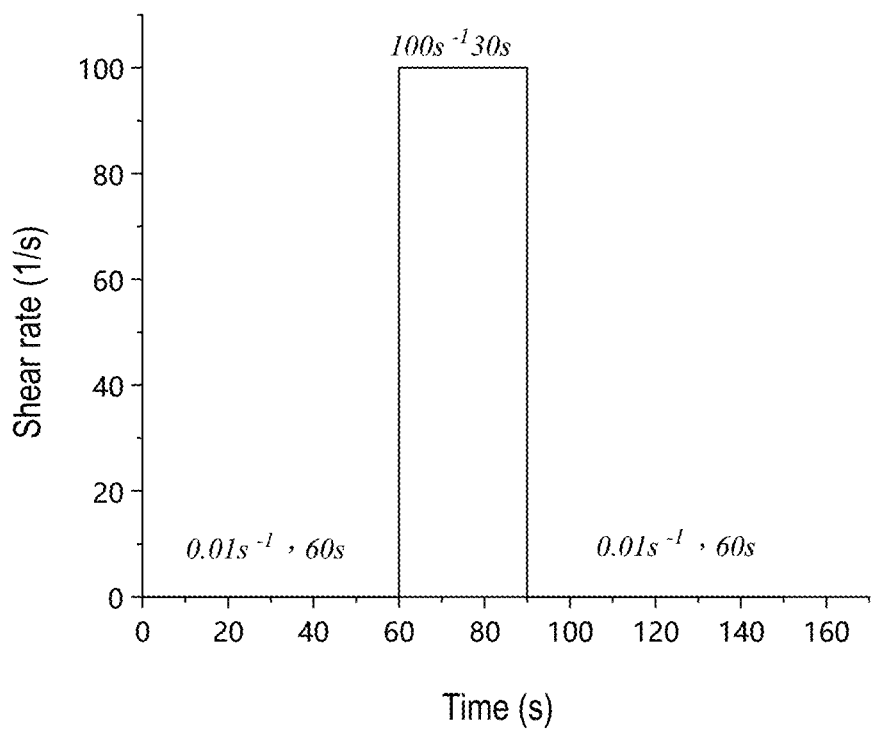
FIG. 6 shows the detailed parameters set for the shear control in the structure recovery test in Example 3.

The detailed parameters set for the shearing control in the structure recovery test are shown in FIG. 6.

Figure 7:
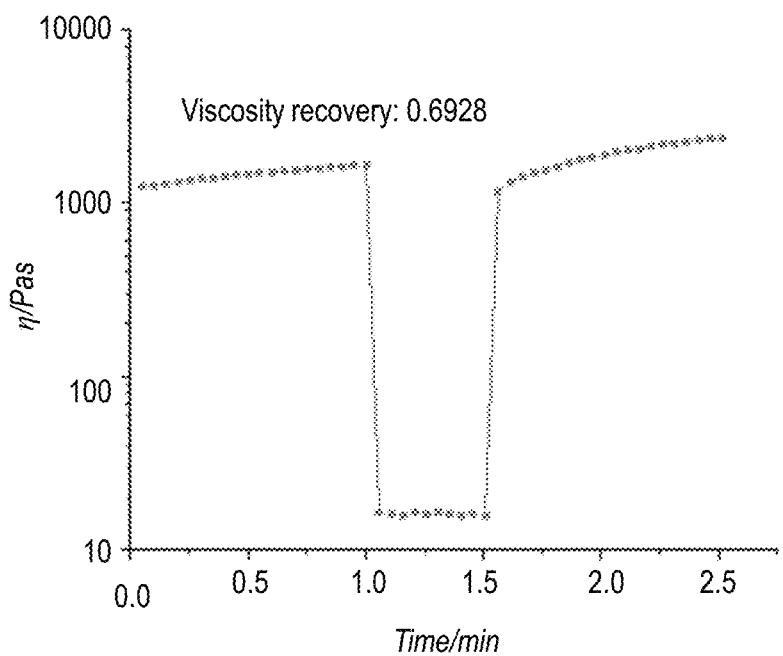
FIG. 7 shows the test result of a structure recovery test in Example 3.

The result of the structure recovery test is shown in FIG. 7. According to FIG. 7, the viscosity of the material was recovered to a great extent at the beginning of the low-speed shear after the high-speed shear, with a recovery rate of 0.6928, indicating good hardening effect of the material after grouting.

In summary of the above examples, the high-toughness geopolymer grouting material modified by ultra-high molecular weight fibers and emulsified asphalt prepared by the present invention has good mechanical properties, workability/rheological properties and durability, and hence it can effectively solve the technical problem of poor durability of conventional grouting materials in solving the problem of voids below the bottom of cement concrete pavement slabs.

The high-toughness geopolymer grouting material modified by ultra-high molecular weight fibers and emulsified asphalt of the present invention has advantages of early strength, multiple cracking in fine cracks and good durability among others.

The high-toughness geopolymer modified by ultra-high molecular weight fibers and emulsified asphalt of the present invention has the characteristics of simple and easy preparation procedures, low cost, good toughness and good matching with the road substrate structure. It can be used in the technology of non-excavation reinforcement and repairs of road base course, subgrade and voids beneath road slabs.

Comparative Example 1

Provided in the present comparative example is a high-toughness geopolymer modified by emulsified asphalt. The components of the material in parts by mass are as follows:
8 parts of an emulsified asphalt,
100 parts of a geopolymer,
120 parts of an alkali-activated solution.

The type, amount and performance criteria of each raw material in the present comparative example, except for the ultra-high molecular weight fibers, are the same as in Example 1.

Figure 8:
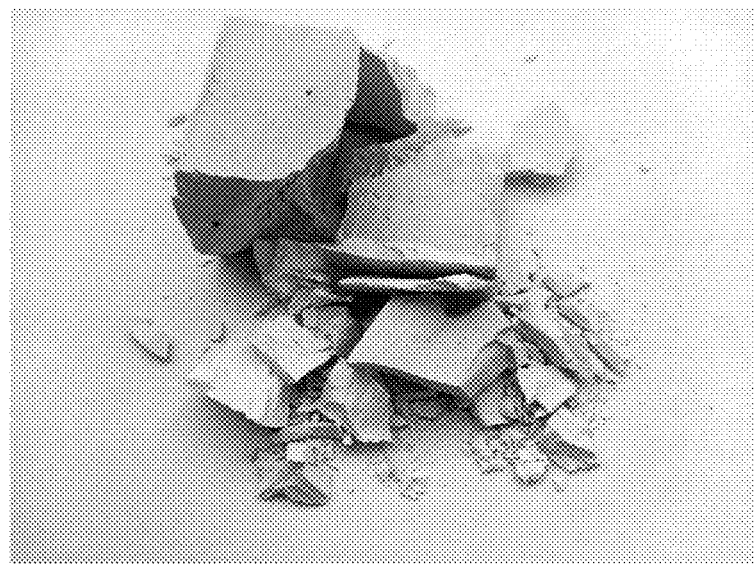
FIG. 8 shows the failure form of the material in Comparative Example 1.

In this comparative example, the strength of the prepared emulsified asphalt-geopolymer specimen was determined using the same test method as in Example 1 in order to further clarify the rheology-modulating effect of the ultra-high molecular weight fibers. Due to the removal of ultra-high molecular weight fibers, the prepared composite material is predominantly brittle, and the failure form is as shown in FIG. 8.

Performance test results of the present comparative example are shown in Table 2.

TABLE 2

| | Measured strength of the material of the present comparative example | | | |
|---|---|---|---|---|
| | Flexural strength/MPa | | Compressive strength/MPa | |
| Age | 7 d | 28 d | 7 d | 28 d |
| Value of strength | 3.1692 | 5.2465 | 33.68 | 36.51 |

The composite material of the present comparative example exhibited a compressive strength that was essentially the same as in that of Example 1, but the flexural strength was significantly lower than that in Example 1; and during the process of damage, there was macroscopic brittle damage but no obvious fine crack damage, indicating that as a grouting material, it is easy to cause a secondary damage of the material, Indicating worse performance thereof than in Example 1.

The compressive strength of the material in the present comparative example was within a range of 30-40 MPa, which is much lower than the strength range of 30-80 MPa of the geopolymer/emulsified asphalt composite material prepared in CN103232182A, so is the flexural strength. One of the reasons for this phenomenon is the variability of material properties and material admixture. Another reason is related to the curing conditions of the specimen. However, the present invention aims to develop a novel geopolymer material suitable for road grouting, for which strength can be sacrificed at a proper level to meet requirements of workability like thixotropy and structural recovery. On the contrast, CN103232182A was designed to prepare a high-strength geopolymer/emulsified-asphalt composite material, for which strength is an important criteria, while workability can be sacrificed at a proper level to improve the strength thereof to a significant extent. However, the material cannot be considered as an ideal grouting material.

Comparative Example 2

Compared to the example, the ultra-high molecular weight fiber component was removed in the present comparative example.

Provided in the present comparative example is a high-toughness geopolymer modified by emulsified asphalt. The components of the material in parts by mass are as follows:
8 parts of emulsified asphalt,
100 parts of a geopolymer, and
90 parts of an alkali-activated solution.

The type, amount and performance criteria of each raw material in the present example, except for the ultra-high molecular weight fibers, are the same as in Examples 2 and 3.

In this comparative example, the thixotropy and structure recovery capability of freshly prepared slurry was determined using the same test method as in Examples 2 and 3 in order to verify more precisely the rheology-modulating effect of the ultra-high molecular weight fibers.

Figure 9:
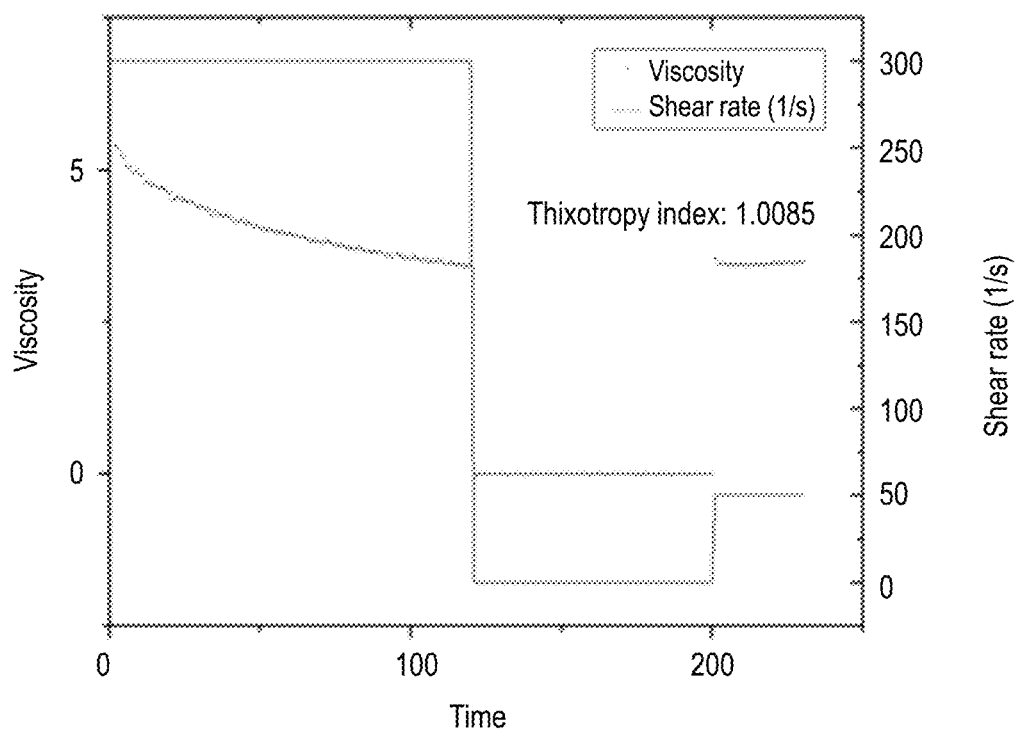
FIG. 9 shows the result of a thixotropy index test of fresh slurry of the high-toughness geopolymer grouting material modified by emulsified asphalt prepared in Comparative Example 2.
Figure 10:
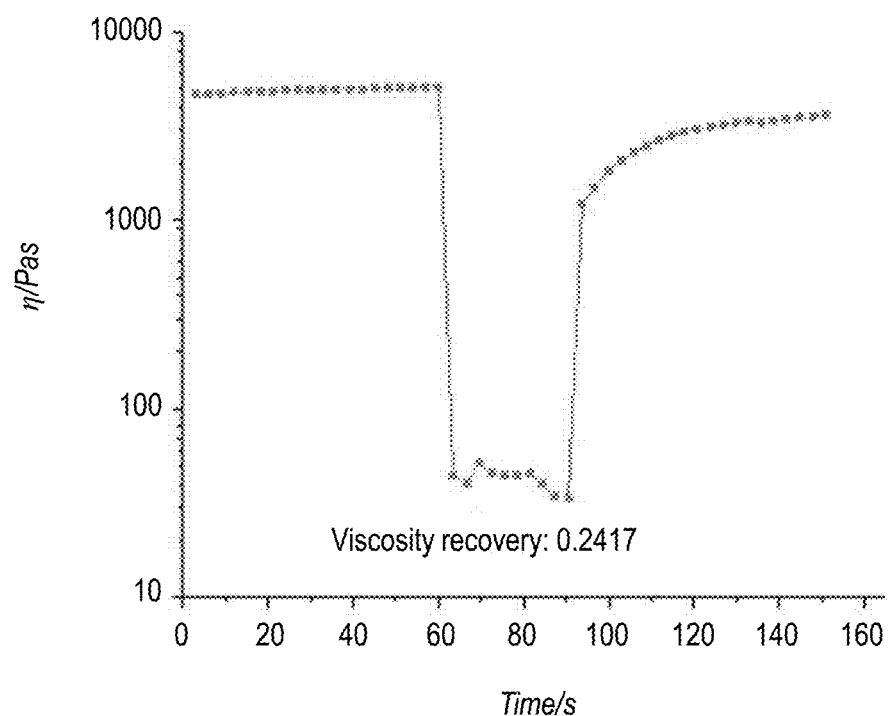
FIG. 10 shows the result of a structure recovery test of fresh slurry of the high-toughness geopolymer grouting material modified by emulsified asphalt prepared in Comparative Example 2.

The results of the thixotropy test and structure recovery test of the material are shown in FIGS. 9 and 10. As demonstrated in FIGS. 9 and 10, the thixotropy index and viscosity recovery of the geopolymer-emulsified asphalt material in the comparative example was 1.0085 and 0.2417, respectively, indicating weaker thixotropy and structural recovery of the composite material without addition of ultra-high molecular weight polyethylene fibers than the material properties in the examples, which means that the high-toughness geopolymer modified by ultra-high molecular weight fibers and emulsified asphalt prepared in the present invention is more suitable as a grouting material.

The above description of the examples is intended for those of ordinary skill in the art to understand and use the invention. Those skilled in the art can obviously make various modifications to these examples easily and apply the general principles illustrated herein to other embodiments without any creative labor. Therefore, the present invention is not limited to the above examples, and any improvement and modification made by those skilled in the art according to the disclosure of the present invention without departing from the scope of the present invention should fall into the protection scope of the present invention.

What is claimed is:

1. A high-toughness geopolymer grouting material modified by ultra-high molecular weight fibers and emulsified asphalt, comprising following components in parts by weight:
    4-12 parts of the emulsified asphalt;
    80-100 parts of a geopolymer;
    103-126 parts of an alkali-activated solution;
    2-3 parts of the ultra-high molecular weight fiber; and
    30-35 parts of water,
    wherein the geopolymer comprises a combination of one or more of metakaolin, kaolinite, fly ash and slag,
    wherein the emulsified asphalt is cationic emulsified asphalt which is medium-breaking or slow-breaking, the cationic emulsified asphalt having a screen residue of less than or equal to 0.1% and 1-day room-temperature stability of less than or equal to 1%,
    wherein the ultra-high molecular weight fiber is polyethylene fiber with a molecular weight of 1,000,000-5,000,000, an ultimate tensile strain of 3%-7%, a fiber length of 6-18 mm, a nominal strength of 2900-3800 MPa and an elastic modulus of 100-120 GPa,
    wherein the alkali-activated solution consists of 11-15 parts of sodium silicate solution and 1-4 parts of sodium hydroxide particles,
    wherein a preparation method of the high-toughness geopolymer grouting material modified by ultra-high molecular weight fibers and emulsified asphalt comprises following steps:
    step (1) weighing preset amounts of sodium silicate solution and sodium hydroxide particles to prepare the alkali-activated solution consisting of 11-15 parts of the sodium silicate solution and 1-4 parts of the sodium hydroxide particles, and allowing the prepared alkali-activated solution to stand for 18-36 h;
    step (2) weighing each raw material according to the mass parts;
    step (3) adding the geopolymer into a mixing pot of a cement paste mixer, turning on the mixer, and after mixing for 20-40 s, adding the alkali-activated solution into the mixing pot for a further mixing for 1-2 min;
    step (4) adding the ultra-high molecular weight fibers into the mixing pot in 2-4 batches, and stirring quickly after the addition of all of the fibers until well-mixed to obtain a geopolymer-based slurry; and
    step (5) adding the emulsified asphalt into the geopolymer-based slurry and mixing well to obtain the high-toughness geopolymer grouting material.

2. The high-toughness geopolymer grouting material modified by ultra-high molecular weight fibers and emulsified asphalt of claim 1, wherein the geopolymer has a density of 2.2-2.7 g·cm$^{-3}$, an elastic modulus of 50-55 GPa, a tensile strength of 30-190 MPa, a compressive strength of 40-120 MPa and a fracture energy of 50-1500 J·cm$^{-2}$.

* * * * *